(12) United States Patent
Fukasawa et al.

(10) Patent No.: US 12,145,471 B2
(45) Date of Patent: Nov. 19, 2024

(54) VEHICLE BRAKE SYSTEM

(71) Applicant: Toyota Jidosha Kabushiki Kaisha, Toyota (JP)

(72) Inventors: Tsukasa Fukasawa, Miyoshi (JP); Naoki Yabusaki, Toyota (JP); Tomohiko Takeda, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 414 days.

(21) Appl. No.: 17/710,121

(22) Filed: Mar. 31, 2022

(65) Prior Publication Data

US 2022/0314814 A1    Oct. 6, 2022

(30) Foreign Application Priority Data

Apr. 6, 2021 (JP) ................................ 2021-064587

(51) Int. Cl.
*B60T 13/58* (2006.01)
*B60L 7/26* (2006.01)

(52) U.S. Cl.
CPC .............. *B60L 7/26* (2013.01); *B60T 13/586* (2013.01); *B60T 2270/604* (2013.01)

(58) Field of Classification Search
CPC ...... B60L 7/26; B60T 13/586; B60T 2270/60; B60T 2270/604
USPC ................................................ 303/151, 152
See application file for complete search history.

(56) References Cited

U.S. PATENT DOCUMENTS

| | | | |
|---|---|---|---|
| 8,152,245 B2 * | 4/2012 | Lubbers | B60T 13/586 303/151 |
| 11,407,314 B2 * | 8/2022 | Takahashi | B60T 8/17 |
| 2007/0018499 A1 * | 1/2007 | Kokubo | B60L 7/14 303/151 |
| 2008/0100129 A1 * | 5/2008 | Lubbers | B60L 7/18 303/113.1 |
| 2012/0074767 A1 * | 3/2012 | Nishio | B60L 50/16 303/3 |
| 2014/0095046 A1 * | 4/2014 | Nishio | B60L 7/26 701/81 |
| 2015/0353064 A1 * | 12/2015 | Spoeri | B60T 8/4072 303/3 |

(Continued)

FOREIGN PATENT DOCUMENTS

JP        2019-059296 A    4/2019

*Primary Examiner* — Thomas W Irvin
(74) *Attorney, Agent, or Firm* — Sughrue Mion, PLLC

(57) ABSTRACT

A vehicle brake system including a regenerative cooperative control device configured to control a regenerative brake device that applies a regenerative braking force to one of front and rear wheels and/or a friction brake device that applies a friction braking force to the front and rear wheels. After the regenerative braking force reaches an allowable regenerative braking force, the friction braking force applied to the other of the front and rear wheels is increased by the friction brake device up to a first friction braking force less than a braking force on an actual braking-force distribution line determined by the regenerative braking force at a time when it reaches the allowable regenerative braking force, and the friction braking forces applied to the one and the other of the front and rear wheels are subsequently increased so as to bring the friction braking forces close to the actual braking-force distribution line.

3 Claims, 5 Drawing Sheets

(56) References Cited

U.S. PATENT DOCUMENTS

2020/0282840 A1 9/2020 Yamamoto
2020/0307386 A1* 10/2020 Takahashi ................. B60T 1/10
2021/0213836 A1* 7/2021 Jeon ......................... B60L 7/26

* cited by examiner

VEHICLE BRAKE SYSTEM

CROSS REFERENCE TO RELATED APPLICATION

The present application claims priority to Japanese Patent Application No. 2021-064587, which was filed on Apr. 6, 2021, the disclosure of which is herein incorporated by reference in its entirety.

BACKGROUND

Technical Field

The following disclosure relates to a vehicle brake system quipped with a regenerative brake device.

Description of Related Art

Patent Document 1 (Japanese Patent Application Publication No. 2019-59296) discloses a vehicle brake system equipped with a regenerative brake device capable of applying a regenerative braking force to front wheels. In the disclosed brake system, after the regenerative braking force of the front wheels reaches an allowable regenerative braking force that is the regenerative braking force the system can output, a friction braking force of rear wheels is increased until it reaches an actual braking-force distribution line (reference characteristics). Thereafter, a friction braking force of the front wheels and the friction braking force of the rear wheels are increased along the reference characteristics. (See paragraphs [0075] and [0076] and FIG. 3 of the Patent Document 1.)

SUMMARY

An aspect of the present disclosure is directed to a technique of preventing or reducing a change in a front-rear direction of a posture of a body of a vehicle that is equipped with a brake system.

In a brake system for a vehicle according to one aspect of the present disclosure, after a regenerative braking force applied to one of a front-wheel side and a rear-wheel side reaches an allowable regenerative braking force, a friction braking force of the other of the front-wheel side and the rear-wheel side is increased up to a braking force that is smaller than a braking force on an actual braking-force distribution line. Thereafter, the friction braking forces of the one and the other of the front-wheel side and the rear-wheel side are increased so as to be brought close to the actual braking-force distribution line. This configuration prevents or reduces a change in the front-rear direction of the posture of the vehicle body, as compared with the configuration disclosed in the Patent Document 1.

BRIEF DESCRIPTION OF THE DRAWINGS

The objects, features, advantages, and technical and industrial significance of the present disclosure will be better understood by reading the following detailed description of an embodiment, when considered in connection with the accompanying drawings, in which.

DETAILED DESCRIPTION OF THE EMBODIMENT

Figure 1:
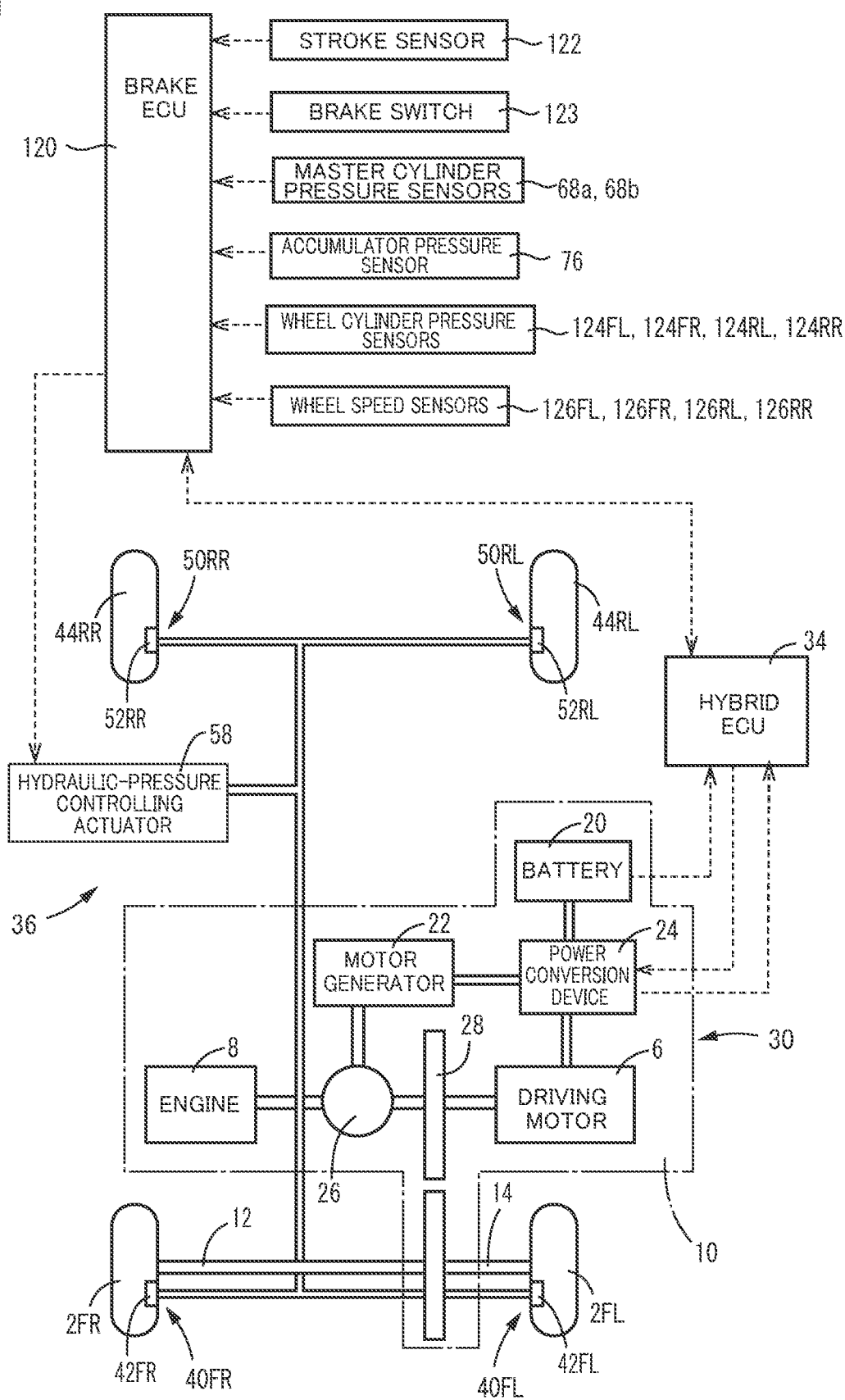
FIG. 1 is a view conceptually illustrating an overall configuration of a brake system for a vehicle according to one embodiment of the present disclosure.

Referring to the drawings, there will be explained in detail a vehicle brake system according to one embodiment of the present disclosure.

There will be explained a vehicle on which is mounted a brake system according to the present embodiment.

The vehicle is a hybrid electric vehicle (HEV) including front left and right wheels 2FL, 2FR, each as a drive wheel, that are driven by a drive device 10. The drive device 10 includes a driving motor 6 that is an electrically driving motor and an engine 8. A drive force of the drive device 10 is transmitted to the front left and right wheels 2FL, 2FR via respective drive shafts 14, 12. The drive device 10 further includes a battery 20, a motor generator 22, a power conversion device 24, a power dividing mechanism 26, in addition to the driving motor 6 and the engine 8. The driving motor 6, the motor generator 22, and the engine 8 are coupled to the power dividing mechanism 26. By controlling the driving motor 6, the motor generator 22, and the engine 8, and the power dividing mechanism 26, at least one of a drive torque of the driving motor 6 and a drive torque of the engine 8 is transmitted to an output member 28. The drive force transmitted to the output member 28 is transmitted to the drive shafts 12, 14 via a speed reducer and a differential device.

The power conversion device 24 includes an inverter, etc. The power conversion device 24 is controlled so as to enable a state of the drive device 10 to be switched at least between a driving state in which the driving motor 6 is rotated by electric energy supplied thereto from the battery 20 and a charging state in which the driving motor 6 serves as a generator in regenerative braking to charge the battery 20 with electric energy. In the charging state, a regenerative braking toque is applied to the front left and right wheels 2FL, 2FR. In the present embodiment, a regenerative brake device 30 is constituted by the power conversion device 24, the driving motor 6, the battery 20, etc. The power conversion device 24 is controlled by a hybrid ECU 34 constituted mainly by a computer.

Figure 2:
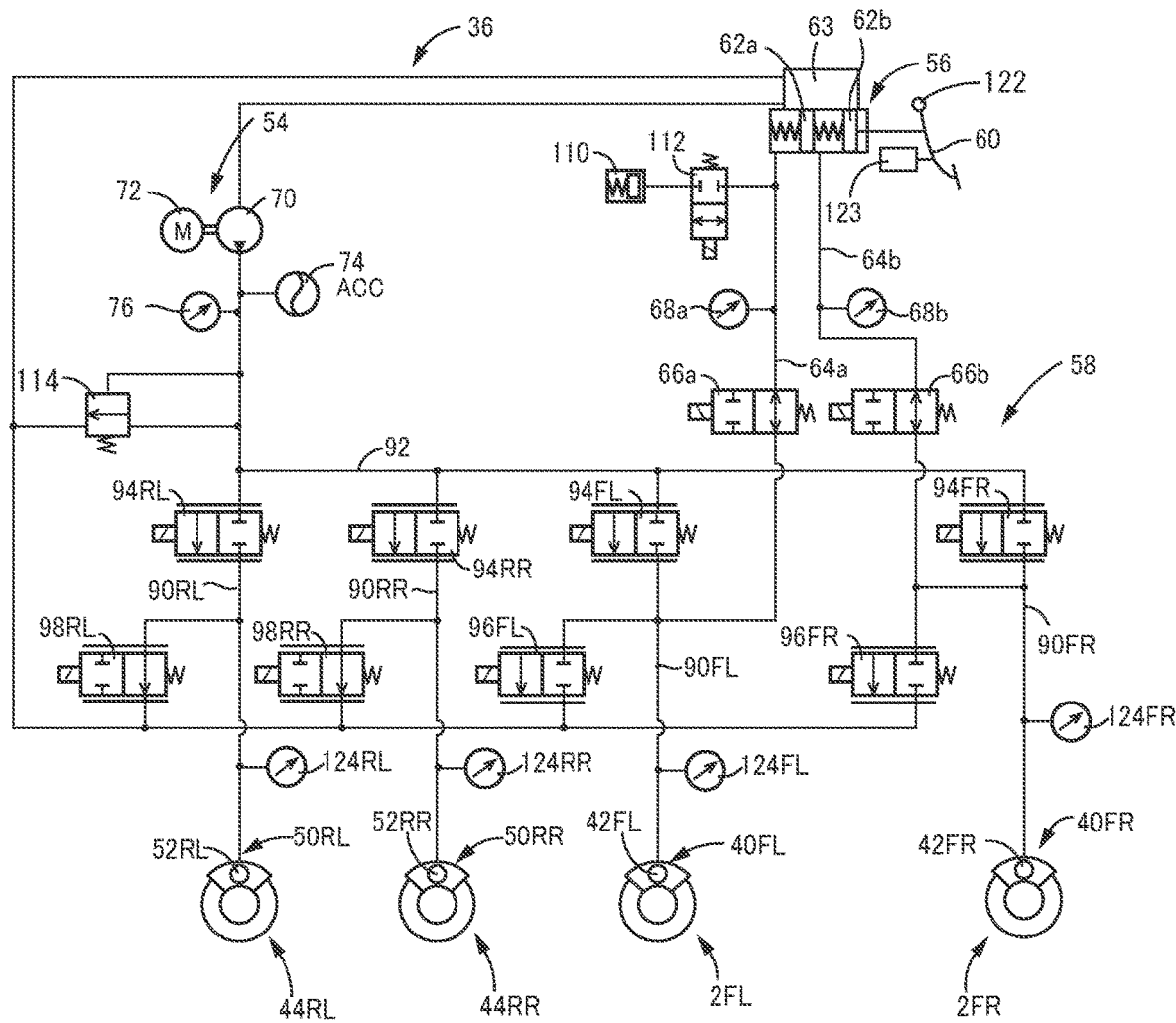
FIG. 2 is a view conceptually illustrating a friction brake device in the brake system.

As illustrated in FIG. 2, a hydraulic brake device 36 as one example of a friction brake device includes: wheel cylinders 42FL, 42FR of respective hydraulic brakes 40FL, 40FR provided for the respective the front left and right wheels 2FL, 2FR; wheel cylinders 52RL, 52RR of respective hydraulic brakes 50RL, 50RR provided for the respective rear left and right wheels 44RL, 44RR; a master cylinder 56 as one example of a manual hydraulic pressure source; and a hydraulic-pressure controlling actuator 58 including a power hydraulic-pressure source 54 and configured to control hydraulic pressures in the respective the wheel cylinders 42FL, 42FR, 52RL, 52RR.

Hereinafter, suffixes FL, FR, RL, RR added to reference signs of components and indicating respective wheel positions are omitted where the components need not be distinguished by their wheel positions or where the components are collectively referred to.

The master cylinder 56 is a tandem cylinder including two pressurizing pistons 62a, 62b. A brake pedal 60 as one example of a brake operating member is coupled to one of the two pressurizing pistons, i.e., the pressurizing piston 62b. The operation of the brake pedal 60 causes hydraulic pressures to be generated respectively in pressurizing chambers defined in front of the respective pressurizing pistons 62a, 62b. In a state in which the pressurizing pistons 62a, 62b are located at respective back end positions, the pressurizing chambers are in communication with a master reservoir 63.

The pressurizing chambers of the master cylinder 56 are respectively connected to the wheel cylinders 42FL, 42FR of the front left and right wheels 2FL, 2FR via respective master passages 64a, 64b. In the master passages 64a, 64b, master shut-off valves 66a, 66b, each as a normally-open electromagnetic open/close valve, are respectively provided. Further, master cylinder pressure sensors 68a, 68b are respectively provided in the master passages 64a, 64b.

The power hydraulic-pressure source 54 includes an accumulator 74 and a pump device that includes a pump 70 and a pump motor 72. The pump 70 is configured to pump up a working fluid in the master reservoir 63 and eject the working fluid. The working fluid ejected from the pump 70 is accumulated in the accumulator 74. An accumulator pressure, which is a hydraulic pressure of the working fluid accumulated in the accumulator 74, is detected by an accumulator pressure sensor 76. The pump motor 72 is controlled such that the accumulator pressure (that is a detection value of the accumulator pressure sensor 76) is kept within a set range. The power hydraulic-pressure source 54 is connected to a common passage 92.

The wheel cylinders 42FL, 42FR provided for the respective front left and right wheels 2FL, 2FR and the wheel cylinders 52RL, 52RR provided for the respective rear left and right wheels 44RL, 44RR are connected to the common passage 92 respectively by individual passages 90FL, 90FR, 90RL, 90RR.

Pressure holding valves 94FL, 94FR, 94RL, 94RR are disposed in the corresponding individual passages 90FL, 90FR, 90RL, 90RR. Pressure reducing valves 96FL, 96FR, 98RL, 98RR are disposed between the corresponding wheel cylinders 42FL, 42FR, 52RL, 52RR and the master reservoir 63.

The pressure holding valves 94 are normally-closed electromagnetic linear valves. The pressure reducing valves 96 provided respectively for the wheel cylinders 42FL, 42FR of the front left and right wheels 2FL, 2FR are normally-closed electromagnetic linear valves. The pressure reducing valves 98 provided respectively for the wheel cylinders 52RL, 52RR of the rear left and right wheels 44RL, 44RR are normally-open electromagnetic linear valves.

In each of the pressure holding valves 94 and the pressure reducing valves 96, 98, a current supplied to a solenoid of each valve is continuously controlled to control a pressure difference between an upstream side and a downstream side of each valve, whereby the hydraulic pressures in the respective wheel cylinders 42, 52 are individually controlled.

In the present embodiment, the hydraulic-pressure controlling actuator 58 is constituted by the power hydraulic-pressure source 54, the master shut-off valves 66a, 66b, the pressure holding valves 94, and the pressure reducing valves 96, 98, for instance.

The individual passages 90 and the power hydraulic-pressure source 54 are connected to the common passage 92. A hydraulic pressure in the power hydraulic-pressure source 54 is controlled by the pressure holding valves 94 so as to be supplied to the wheel cylinders 42, 52.

The master passage 64a is connected to a portion of the individual passage 90FL located downstream of the pressure holding valve 94FL, and the master passage 64b is connected to a portion of the individual passage 90FR located downstream of the pressure holding valve 94FR.

A stroke simulator 110 is connected to the master passage 64a via a simulator control valve 112. The simulator control valve 112 is a normally-closed electromagnetic open/close valve.

A pressure release valve 114 is provided between the power hydraulic-pressure source 54 and the master reservoir 63 to prevent the hydraulic pressure in the power hydraulic-pressure source 54 from becoming excessively high.

The hydraulic brake device 36 is controlled by a brake ECU 120 constituted mainly by a computer.

There are connected, to an input/output device of the brake ECU 12, the master cylinder pressure sensors 68a, 68b, the accumulator pressure sensor 76, a stroke sensor 122 for detecting a stroke of the brake pedal 60, a brake switch 123 configured to detect the brake pedal 60 is operated, wheel cylinder pressure sensors 124 for individually detecting the hydraulic pressures in the wheel cylinders 42, 52 that are respectively provided for the front left and right wheels 2 and the rear left and right wheels 44, wheel speed sensors 126 respectively provided for the front left and right wheels 2 and the rear left and right wheels 44 to detect rotational speeds of the corresponding wheels, and the hydraulic-pressure controlling actuator 58.

The brake ECU 120 and the hybrid ECU 34 are communicable to each other.

In the thus constructed brake system, a regenerative cooperative control is executed when a brake request is made.

For instance, the brake request is made i) when the brake switch 123 is turned to ON, ii) when an object present in surroundings of an own vehicle (i.e., a vehicle Vh on which the present brake system is installed) is detected by a camera, a radar, etc., and it is detected that the brake needs to be actuated based on a relative positional relationship between the own vehicle and the object, or iii) when drive slips of the wheels 2, 44 are excessive.

The brake ECU 120 obtains a requested total braking force FS. For instance, the requested total braking force FS is obtained based on detection values of the stroke sensor 122 and the master cylinder pressure sensors 68a, 68b, based on the relative positional relationship between the own vehicle and the object present in the surroundings of the own vehicle, or based on the drive slips.

Based on the rotational speed of the driving motor 6, the charged amount of the battery 20, etc., the hybrid ECU 34 obtains a value of the regenerative braking force that is allowed at that time point. That is, the hybrid ECU 34 obtains an allowable regenerative braking force Fdz. The obtained allowable regenerative braking force Fdz is supplied to the brake ECU 120. The brake ECU 120 compares the allowable regenerative braking force Fdz and the requested total braking force FS. When the allowable regenerative braking force Fdz is not less than the requested total braking force FS, the requested total braking force FS is determined to be a requested regenerative braking force Fdt, and the requested regenerative braking force Fdt is supplied to the hybrid ECU 34. In the regenerative brake device 30, the power conversion device 24 is controlled such that an actual regenerative braking force Fdx is brought close to the requested regenerative braking force Fdt. The actual regenerative braking force Fdx is the regenerative braking force that is obtained based on the current flowing in the power conversion device 24, etc., and that is actually output. The actual regenerative braking force Fdx is increased in a period during which the allowable regenerative braking force Fdz is not less than the requested total braking force FS. The actual regenerative braking force Fdx is supplied to the brake ECU 120.

When the requested total braking force FS becomes greater than the allowable regenerative braking force Fdz, a requested friction braking forces Fpt is determined based on a value obtained by subtracting the allowable regenerative braking force Fdz or the actual regenerative braking force Fdx from the requested total braking force FS, and a friction braking force as a hydraulic braking force is applied. In the hydraulic brake device 36, the pressure holding valves 94 and the pressure reducing valves 96, 98 are controlled to control the hydraulic pressures in the hydraulic brakes 40 of the front wheels 2 and the hydraulic pressures in the hydraulic brakes 50 of the rear wheels 44 in a closed state of the master shut-off valves 66a, 66b utilizing the hydraulic pressure in the power hydraulic-pressure source 54. A sum of actual hydraulic pressures of the respective wheel cylinders 42, 52 detected by the corresponding wheel cylinder pressure sensors 124 are brought close to a requested hydraulic pressure corresponding to the requested friction braking force Fpt, and an actual friction braking force corresponding to the sum of the actual hydraulic pressures of the wheel cylinders 42, 52 is brought close to the requested friction braking force Fpt.

When the actual regenerative braking force Fdx is controlled so as to be brought close to the allowable regenerative braking force Fdz in the regenerative brake device 30 in the situation in which the requested total braking force FS is greater than the allowable regenerative braking force Fdz, it is conceivable that the allowable regenerative braking force Fdz and the actual regenerative braking force Fdx are substantially the same. In this case, the requested friction braking force Fpt may be obtained based on a value obtained by subtracting the allowable regenerative braking force Fdz from the requested total braking force FS or may be obtained based on a value obtained by subtracting the actual regenerative braking force Fdx from the requested total braking force FS. In a case where the actual regenerative braking force Fdx and the allowable regenerative braking force Fdz are not necessarily substantially the same in the situation in which the requested total braking force FS is greater than the allowable regenerative braking force Fdz, the requested friction braking force Fpt is desirably obtained based on the value obtained by subtracting the actual regenerative braking force Fdx from the requested total braking force FS.

Figure 4A:
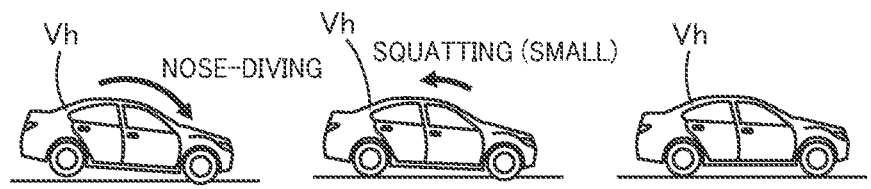
FIG. 4A is a view illustrating a change of a posture of a body of the vehicle on which the brake system is installed.
Figure 4B:
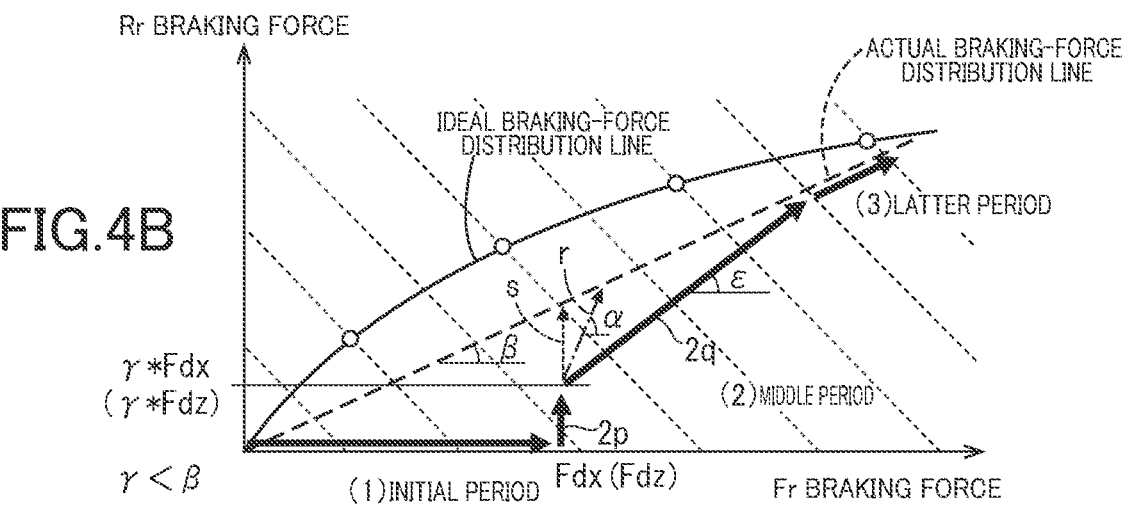
FIG. 4B is a view illustrating front/rear braking force distribution lines in the brake system.
Figure 5A:
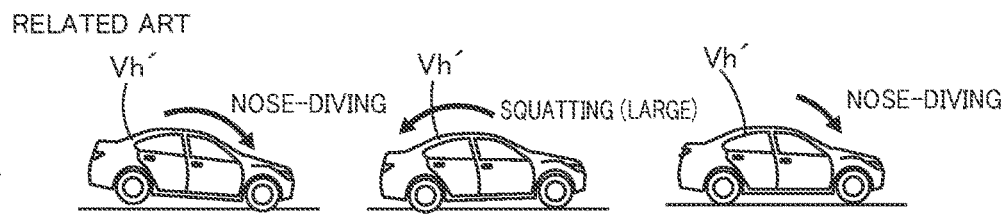
FIG. 5A is a view illustrating a change of a posture of a body of a vehicle on which a conventional brake system is installed.
Figure 5B:
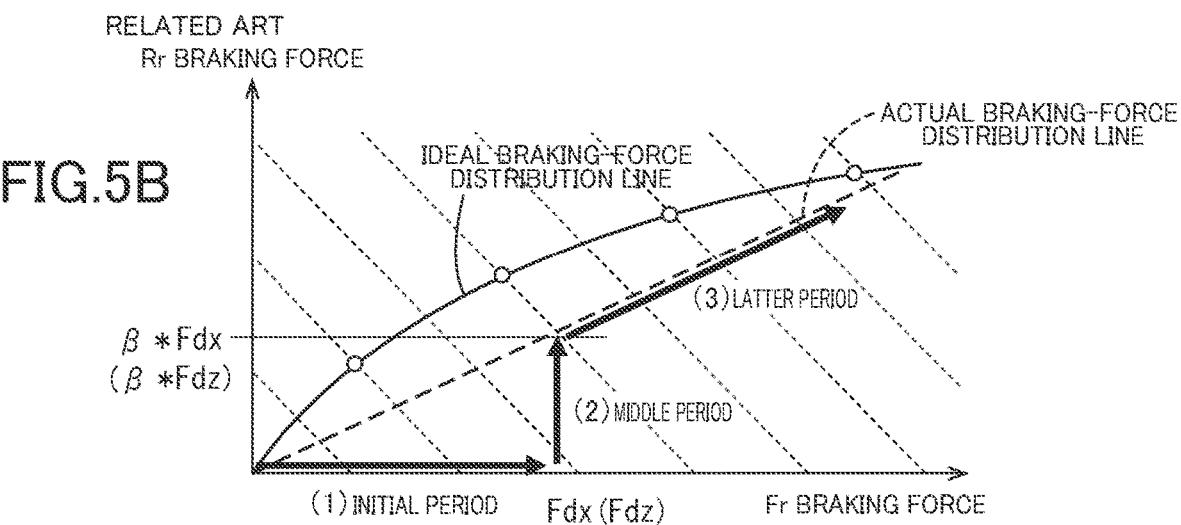
FIG. 5B is a view illustrating front/rear braking force distribution lines in the conventional brake system.

In each of FIGS. 4B and 5B, a solid line represents an ideal braking-force distribution line, and a dashed line represents an actual braking-force distribution line. The ideal braking-force distribution line represents a distribution ratio between a front-wheel braking force FFr applied to the front wheels and a rear-wheel braking force FRr applied to the rear wheels when the front wheels and the rear wheels lock simultaneously. In the present embodiment, the front-wheel braking force FFr is a sum of the regenerative braking force, a front-left-wheel friction braking force, and a front-right-wheel friction braking force, and the rear-wheel braking force FRr is a sum of a rear-left-wheel friction braking force and a rear-right-wheel friction braking force. The actual braking-force distribution line represents a distribution ratio between the front-wheel braking force and the rear-wheel braking force designed for a vehicle, for instance. The actual braking-force distribution line is set in a region in which the rear-wheel braking force is smaller with respect to the ideal braking-force distribution line. In most cases, the actual braking-force distribution line refers to the distribution ratio between a front-wheel hydraulic braking force and a rear-wheel hydraulic braking force designed for a vehicle. A gradient of the actual braking-force distribution line, namely, a ratio of the rear-wheel braking force FRr with respect to the front-wheel braking force FFr, is a set value p in most cases. In the present embodiment, the ratio of the rear-wheel braking force FRr with respect to the front-wheel braking force FFr is equal to a ratio of a change amount ΔFRr of the rear-wheel braking force with respect to a change amount ΔFFr of the front-wheel braking force.

$FRr/FFr=\beta$ $\Delta FRr/\Delta FFr=\beta$

In the conventional brake system illustrated in FIG. 5B, in a period during which the requested total braking force FS is not greater than the allowable regenerative braking force Fdz, the front-wheel friction braking force Fpf and the rear-wheel friction braking force Fpr are 0, the regenerative braking force Fd is increased, and the front-wheel braking force FFr is increased, as illustrated in an initial period (1). When the regenerative braking force Fd reaches the allowable regenerative braking force Fdz, the rear-wheel friction braking force Fpr is increased until it reaches the actual braking-force distribution line. That is, the rear-wheel friction braking force Fpr is increased up to a value β*Fdx obtained by multiplying the actual regenerative braking force Fdx by the ratio β, as illustrated in a middle period (2). Thereafter, the front-wheel braking force FFr (Fpf+Fdz) and the rear-wheel braking force FRr (=Fpr) are increased along the actual braking-force distribution line, as illustrated in a latter period (3).

As illustrated in FIG. 5A, a vehicle Vh', on which the conventional brake system is installed, takes a nose-diving posture in the initial period (1) due to the increase in the front-wheel braking force FFr. In the middle period (2), the vehicle Vh' takes a largely squatting posture due to the increase in the rear-wheel braking force FRr. In reaction, the vehicle Vh' takes the nose-diving posture. In the conventional brake system, the posture of the vehicle Vh' (vehicle body) largely changes in the front-rear direction when the state of the brake system shifts from a state in which the requested total braking force is satisfied by only the regenerative braking force to a state in which the requested total braking force is satisfied by both the regenerative braking force and the friction braking forces.

In the present embodiment, therefore, the posture of the vehicle is prevented from being largely changed in the front-rear direction in the regenerative cooperative control by making an increase amount of the rear-wheel friction braking force smaller in the middle period (2) than that in the conventional brake system and thereafter increasing both the front-wheel friction braking force and the rear-wheel friction braking force at a gentle gradient, so as to bring the front-wheel braking force FFr and the rear-wheel braking force FRr close to the actual braking-force distribution line.

Figure 3:
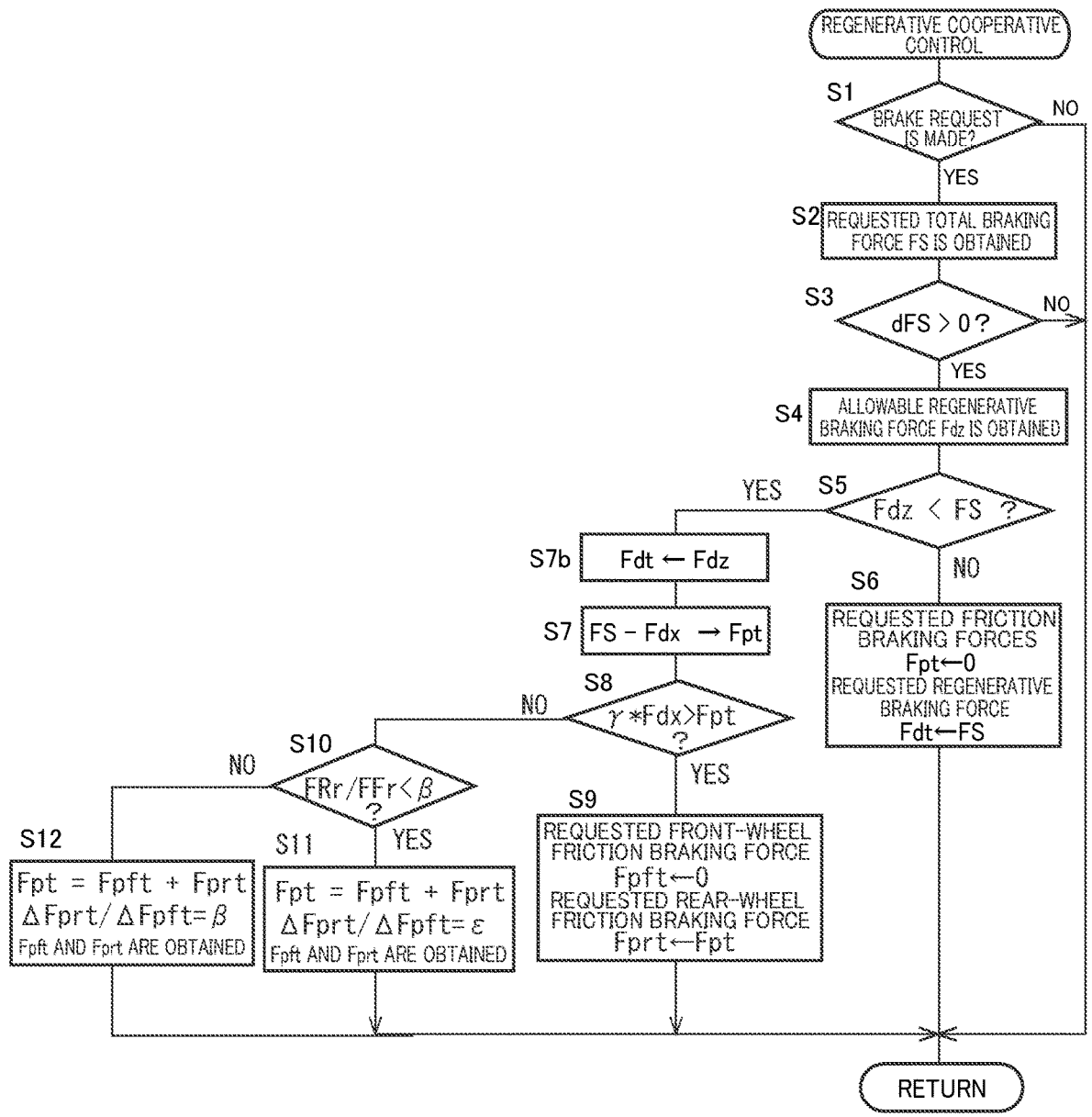
FIG. 3 is a flowchart representing a regenerative cooperative control program stored in a storage of a brake ECU in the brake system.

The brake ECU 120 executes a regenerative cooperative control program represented by a flowchart of FIG. 3 each time when a set time elapses.

At Step 1, it is determined whether the brake request is made. (Hereinafter, Step 1 will be abbreviated as S1. Other steps will be abbreviated similarly.) When an affirmative determination (YES) is made, the requested total braking force FS is obtained at S2. It is then determined at S3 whether the requested total braking force FS has an increasing tendency. When an affirmative determination (YES) is made, S4 and subsequent steps are implemented. In other words, S4 and subsequent steps are implemented in a case where the requested total braking force FS is increasing.

At S4, the allowable regenerative braking force Fdz is obtained. At S5, it is determined whether the allowable regenerative braking force Fdz is less than the requested total braking force FS. In a case where a negative determination (NO) is made at S5, the requested total braking force FS is satisfied by the regenerative braking force Fd. Thus, the necessity to apply the friction braking forces is low. Accordingly, at S6, the requested friction braking force Fpt is determined to be 0, and the requested regenerative braking force Fdt is determined to be equal to the requested total braking force FS. Hereafter, implementation of S1-S6 causes the regenerative braking force Fd and the front-wheel braking force FFr to be increased.

In a case where an affirmative determination (YES) is made at S5, on the other hand, the control flow proceeds to S7b at which the allowable regenerative braking force Fdz is determined to be equal to the requested regenerative braking force Fdt. At S7, the actual regenerative braking force Fdx is obtained, the requested friction braking force Fpt is obtained based on the value obtained by subtracting the actual regenerative braking force Fdx from the requested total braking force FS, and a first friction braking force ($\gamma$*Fdx) is obtained by multiplying the actual regenerative braking force Fdx with a ratio $\gamma$. The ratio $\gamma$ is smaller than a gradient $\beta$ ($\gamma<\beta$) of the actual braking-force distribution line indicated by the dashed line in each of FIGS. 4B and 5B, The gradient $\beta$ of the actual braking-force distribution line represents the ratio of the rear-wheel braking force FRr with respect to the front-wheel braking force FFr, i.e., FRr/FFr. At S8, it is determined whether the requested friction braking force Fpt is less than the first friction braking force ($\gamma$*Fdx).

When an affirmative determination (YES) is made at S8, the control flow proceeds to S9 at which the requested front-wheel friction braking force Fpft is determined to be 0 and the requested rear-wheel friction braking force Fprt is determined to be equal to the requested friction braking force Fpt. The front-wheel friction braking force is not increased but the actual rear-wheel friction braking force Fprx is increased, so that the actual rear-wheel friction braking force Fprx is brought close to the requested friction braking force Fpt and close to the first friction braking force ($\gamma$*Fdx). The rear-wheel braking force is increased earlier for preventing or reducing lock of the front wheels at an early stage.

When the requested friction braking force Fpt reaches the first friction braking force ($\gamma$*Fdx) and the actual rear-wheel friction braking force Fprx reaches the first friction braking force ($\gamma$*Fdx), a negative determination (NO) is made at S8. As indicated by a solid line 2p in FIG. 4B, the actual rear-wheel friction braking force Fprx is increased up to the value ($\gamma$*Fdx) that is less than the value ($\beta$*Fdx) on the actual braking-force distribution line.

At S10, it is determined whether the ratio (FRr/FFr) of the rear-wheel braking force FRr with respect to the front-wheel braking force FFr is less than p. When the front-wheel braking force FFr and the rear-wheel braking force FRr are in a region in which the rear-wheel braking force FRr is smaller with respect to the actual braking-force distribution line, the ratio (FRr/FFr) is less than $\beta$. In other words, it is determined at S10 whether the front-wheel braking force FFr and the rear-wheel braking force FRr are in the region in which the rear-wheel braking force is smaller with respect to the actual braking-force distribution line.

When S10 is executed for the first time, an affirmative determination (YES) is made. In this case, at S11, the requested front-wheel friction braking force Fpft and the requested rear-wheel friction braking force are determined such that a ratio between an increase amount $\Delta$Fpft of the requested front-wheel friction braking force Fpft and an increase amount $\Delta$Fprt of the requested rear-wheel friction braking force Fprt, namely, $\Delta$Fprt/$\Delta$Fpft, is equal to a ratio (gradient) $\varepsilon$ and a sum of the requested front-wheel friction braking force Fpft and the requested rear-wheel friction braking force Fprt is equal to the requested friction braking force Fpt. The actual front-wheel friction braking force Fpfx and the actual rear-wheel friction braking force Fprx are brought close to the requested front-wheel friction braking force Fpft and the requested rear-wheel friction braking force Fprt, respectively, and are increased as indicated by a solid line 2q in FIG. 4B.

In the present embodiment, the ratio $\varepsilon$ is greater than the ratio $\beta$ as illustrated in FIG. 4B. The ratio $\varepsilon$ may be a value less than a gradient $\alpha$ of a straight line r indicated by a long dashed short dashed line in FIG. 4B, for instance. The ratio $\varepsilon$ is set to a value that enables the front-wheel braking force FFr and the rear-wheel braking force FRr to be brought close to the actual braking-force distribution line and that enables a pitch rate of the vehicle body to be suppressed.

An increase amount of the front-wheel friction braking force is greater than 0. As compared with the conventional brake system in which the rear-wheel friction braking force is increased until it reaches the actual braking-force distribution line in a state in which the front-wheel friction braking force is kept at 0, the front-wheel braking force FFr and the rear-wheel braking force FRr are gently brought close to the actual braking-force distribution line in the present embodiment.

When the front-wheel braking force FFr and the rear-wheel braking force FRr thereafter reach the actual braking-force distribution line, a negative determination (NO) is made at S10. The control flow then proceeds to S12 at which the requested front-wheel friction braking force Fpft and the requested rear-wheel friction braking force Fprt are determined such that the ratio between the increase amount $\Delta$Fpft of the requested front-wheel friction braking force Fpft and the increase amount $\Delta$Fprt of the requested rear-wheel friction braking force Fprt, namely, $\Delta$Fprt/$\Delta$Fpft, is equal to $\beta$ and the sum of the requested front-wheel friction braking force Fpft and the requested rear-wheel friction braking force Fprt is equal to the requested friction braking force Fpt. The actual front-wheel friction braking force Fpfx and the actual rear-wheel friction braking force Fprx are brought close to the requested front-wheel friction braking force Fpft and the requested rear-wheel friction braking force Fprt, respectively. As a result, the front-wheel braking force FFr and the rear-wheel braking force FRr are increased along the actual braking-force distribution line.

In the present embodiment, as illustrated in FIG. 4B, the actual regenerative braking force Fdx reaches the allowable regenerative braking force Fdz in the initial period (1). Subsequently, in the middle period (2), the rear-wheel friction braking force Fpr is increased as indicated by the solid line 2p up to the value (γ*Fdx) that is less than the value on the actual braking-force distribution line, and the front-wheel friction braking force Fpf and the rear-wheel friction braking force Fpr are thereafter increased as indicated by the solid line 2q at the predetermined gradient ε, so as to be brought close to the actual braking-force distribution line. As a result, as illustrated in FIG. 4A, the vehicle Vh on which the present brake system is installed takes a nose-diving posture in the initial period (1) and subsequently takes a squatting posture in the middle period (2). However, the inclination of the vehicle body due to the increase in the rear-wheel friction braking force Fpr can be made small, and the inclination thereafter is gentle. It is thus possible to prevent or reduce a change in the front-rear direction of the posture of the vehicle Vh when the state of the brake system shifts from the state in which the requested total braking force FS is satisfied by only the regenerative braking force Fd to the state in which the requested total braking force FS is satisfied by both the regenerative braking force Fd and the friction braking forces Fp, i.e., Fpf and Fpr.

In the illustrated embodiment, the regenerative cooperative control device is constituted by portions of the brake ECU 120 and the hybrid ECU 34 that store and execute the regenerative cooperative control program represented by the flowchart of FIG. 3, for instance. The first set value corresponds to β, the second set value corresponds to γ, and the third set value corresponds to α. The first friction braking force may be γ*Fdz.

The present brake system is installable on not only the hybrid electric vehicles (HEV) but also plug-in hybrid electric vehicles (PHEV), battery electric vehicles (BEV), and fuel cell electric vehicles (FCEV), for instance.

It is not essential to provide the hybrid ECU 34 and the brake ECU 120 separately. The hybrid ECU 34 and the brake ECU 120 may be a single ECU.

The friction brake device may have any configuration. For instance, the hydraulic brake may be replaced with an electric brake. In either case, the friction brake device may have any configuration at least as long as the friction braking force can be controlled individually on the front-wheel side and the rear-wheel side.

It is to be understood that the present disclosure is not limited to the details of the illustrated embodiment, but may be embodied with various changes and modifications, which may occur to those skilled in the art, without departing from the spirit and the scope of the disclosure.

Claimable Inventions (1) A brake system for a vehicle, including:
a regenerative brake device configured to apply a regenerative braking force to one of front wheels and rear wheels of the vehicle;
a friction brake device configured to apply a friction braking force to the front wheels and a friction braking force to the rear wheels; and
a regenerative cooperative control device configured to control at least one of the regenerative brake device and the friction brake device to control a braking force applied to the vehicle,
wherein, after the regenerative braking force reaches an allowable regenerative braking force, the regenerative cooperative control device controls the friction brake device to: increase the friction braking force applied to the other of the front wheels and the rear wheels up to a first friction braking force that is less than a braking force on an actual braking-force distribution line determined by the regenerative braking force at a time when the regenerative braking force reaches the allowable regenerative braking force, without increasing the friction braking force applied to the one of the front wheels and the rear wheels; and subsequently increase the friction braking forces respectively applied to the one and the other of the front wheels and the rear wheels, so as to bring the friction braking forces close to the actual braking-force distribution line.

In the configuration described above, the friction braking force applied to the one of the front wheels and the rear wheels and the friction braking force applied to the other of the front wheels and the rear wheels are brought close to the actual braking-force distribution line by increasing both the friction braking forces. This configuration can prevent or reduce the change in the front-rear direction of the posture of the vehicle body, as compared with the conventional configuration in which the friction braking force applied to the one of the front wheels and the rear wheels and the friction braking force applied to the other of the front wheels and the rear wheels are brought close to the actual braking-force distribution line by increasing the friction braking force applied to the other of the front wheels and the rear wheels.

In the configuration described above, both the front-wheel friction braking force and the rear-wheel friction braking force are increased after the rear-wheel friction braking force is initially increased to a certain degree, thus preventing or reducing the change in the front-rear direction of the posture of the vehicle while appropriately suppressing lock of the front wheels at an early stage.

In a case where the actual regenerative braking force and the allowable regenerative braking force, each of which is the regenerative braking force, are substantially the same, the braking force on the actual braking-force distribution line determined by the regenerative braking force and the braking force on the actual braking-force distribution line determined by the allowable regenerative braking force have substantially the same magnitude.

(2) The brake system according to the form (1),
wherein the actual braking-force distribution line represents a ratio between: the braking force applied to the one of the front wheels and the rear wheels; and the braking force applied to the other of the front wheels and the rear wheels,
wherein the ratio is a first set value, and
wherein the regenerative cooperative control device determines the first friction braking force to be a value obtained by multiplying the regenerative braking force by a second set value less than the first set value.

The braking force applied to the one of the front wheels and the rear wheels includes the regenerative braking force and the friction braking force, and he braking force applied to the other of the front wheels and the rear wheels includes the friction braking force.

(3) The brake system according to the form (2), wherein the regenerative cooperative control device increases the friction braking forces respectively applied to the one and the other of the front wheels and the rear wheels in a state in which a ratio of an increase amount of the friction braking force applied to the other of the front wheels and the rear wheels with respect to an increase amount of the friction braking force applied to the one of the front wheels and the rear wheels is kept at a value that is greater than the first set value and less than a third set value, the third set value being greater than the first set value.

The third set value may be set to a value of the gradient of a dashed line s in FIG. 4B or a value of the gradient of the long dashed short dashed line r in FIG. 4B, for instance.

Instead of linearly increasing the friction braking forces applied to the one and the other of the front wheels and the rear wheels, the friction braking forces may be increased in steps or in a curved fashion.

(4) The brake system according to any one of the forms (1) through (3),
 wherein the friction brake device includes a front-wheel brake device configured to control the friction braking force applied to the front wheels and a rear-wheel brake device configured to control the friction braking force applied to the rear wheels, and
 wherein, when the regenerative braking force reaches the allowable regenerative braking force, the regenerative cooperative control device controls one of the front-wheel brake device and the rear-wheel brake device that is the braking device configured to control the friction braking force applied to the other of the front wheels and the rear wheels, so as to increase the friction braking force applied to the other of the front wheels and the rear wheels up to the first friction braking force.

The front-wheel brake device includes the hydraulic brakes 40FL, 40FR, the pressure holding valves 94FL, 94FR, and the pressure reducing valves 96FL, 96FR provided for the front left wheels 2FL and the front right wheels 2FR. The rear-wheel brake device includes the hydraulic brake 50RL, 50RR, the pressure holding valves 94RL, 94RR, and the pressure reducing valves 98RL, 98RR provided for the rear left and right wheels 44RL, 44RR.

(5) The brake system according to any one of the forms (1) through (4), wherein the regenerative cooperative control device controls at least one of the regenerative brake device and the friction brake device such that a sum of: the regenerative braking force; and the friction braking forces respectively applied to the front wheels and the rear wheels is brought close to a requested total braking force.

(6) A regenerative cooperative control method in a brake system for a vehicle including: a regenerative brake device configured to apply a regenerative braking force to at least one of front wheels and rear wheels of the vehicle; and a friction brake device configured to apply a friction braking force to the front wheels and a friction braking force to the rear wheels, the regenerative cooperative control method being for controlling a braking force applied to the vehicle by controlling at least one of the regenerative brake device and the friction brake device, the regenerative cooperative control method including:
 a first step of increasing the regenerative braking force up to an allowable regenerative braking force;
 a second step of increasing, after the regenerative braking force reaches the allowable regenerative braking force, the friction braking force applied to the other of the front wheels and the rear wheels up to a first friction braking force that is less than a braking force on an actual braking-force distribution line determined by the regenerative braking force, without increasing the friction braking force applied to the one of the front wheels and the rear wheels; and
 a third step of increasing, after the friction braking force applied to the other of the front wheels and the rear wheels reaches the first friction braking force, the friction braking forces respectively applied to the one and the other of the front wheels and the rear wheels, so as to bring the braking forces close to the actual braking-force distribution line.

S5 and S6 correspond to the first step. S8 and S9 correspond to the second step. S10 and S11 correspond to the third step.

What is claimed is:

1. A regenerative cooperative control method in a brake system for a vehicle including: a regenerative brake device configured to apply a regenerative braking force to one of front wheels and rear wheels of the vehicle; and a friction brake device configured to apply a friction braking force to the front wheels and a friction braking force to the rear wheels, the regenerative cooperative control method being for controlling a braking force applied to the vehicle by controlling at least one of the regenerative brake device or the friction brake device, the regenerative cooperative control method including:
 increasing the regenerative braking force up to an allowable regenerative braking force;
 increasing, after the regenerative braking force reaches the allowable regenerative braking force, the friction braking force applied to the other of the front wheels and the rear wheels up to a first friction braking force that is less than a braking force on an actual braking-force distribution line determined by the regenerative braking force at a time when the regenerative braking force reaches the allowable regenerative braking force, without increasing the friction braking force applied to the one of the front wheels and the rear wheels; and
 increasing, after the friction braking force applied to the other of the front wheels and the rear wheels reaches the first friction braking force, the friction braking forces respectively applied to the one and the other of the front wheels and the rear wheels, so as to bring the braking forces close to the actual braking-force distribution line,
 wherein the actual braking-force distribution line represents a ratio between the braking force applied to the one of the front wheels and the rear wheels and the braking force applied to the other of the front wheels and the rear wheels,
 wherein the ratio is a first set value, and
 wherein the increasing, after the regenerative braking force reaches the allowable regenerative braking force, the friction braking force applied to the other of the front wheels and the rear wheels comprises:
  determining the first friction braking force to be a value obtained by multiplying the regenerative braking force at a time when the regenerative braking force reaches the allowable regenerative braking force by a second set value less than the first set value; and
  determining whether the friction braking force applied to the other of the front wheels and the rear wheels reaches the first friction braking force determined in the determining of the first friction braking force.

2. The regenerative cooperative control method according to claim 1, wherein, in the increasing, after the friction braking force applied to the other of the front wheels and the rear wheels reaches the first friction braking force, the friction braking forces respectively applied to the one and the other of the front wheels and the rear wheels are increased in a state in which a ratio of an increase amount of the friction braking force applied to the other of the front wheels and the rear wheels with respect to an increase amount of the friction braking force applied to the one of the front wheels and the rear wheels is kept at a value greater than the first set value and less than a third set value, the third set value being greater than the first set value.

3. The regenerative cooperative control method according to claim 1, further comprising, after the increasing, after the friction braking force applied to the other of the front wheels and the rear wheels reaches the first friction braking force, the friction braking forces respectively applied to the one and the other of the front wheels and the rear wheels, increasing (a) a force obtained by adding the friction braking force applied to the one of the front wheels and the rear wheels and the regenerative braking force, and (b) the friction braking force applied to the other of the front wheels and the rear wheels, along the actual braking-force distribution line.

* * * * *